Dec. 25, 1951 E. P. G. WRIGHT ET AL 2,579,530
FOUR-WIRE TO TWO-WIRE CONNECTING CIRCUIT
Filed April 28, 1948

INVENTORS
ESMOND P. G. WRIGHT
MARC VAN HASSELT
DONALD A. WEIR
BY Robert Harding Jr.
ATTORNEY Patented Dec. 25, 1951

2,579,530

UNITED STATES PATENT OFFICE 2,579,530

FOUR-WIRE TO TWO-WIRE CONNECTING CIRCUIT

Esmond Philip Goodwin Wright, Marc van Hasseit, and Donald Adams Weir, London, England, assignors to International Standard Electric Corporation, New York, N. Y.

Application April 28, 1948, Serial No. 23,844
In Great Britain April 29, 1947

4 Claims. (Cl. 179—16)

This invention relates to telecommunication exchange systems using four wire and two wire circuits capable of interconnection in setting up substation to substation connections and using voice frequency signalling over four wire circuits.

The object of the invention is to improve the signalling safeguards used in such systems.

Voice frequency signals transmitted in one direction over a long distance telephone connection are liable to be reflected from a point such as a four wire two wire junction to cause signals of a relatively low level to return in the opposite direction. Such reflections are liable to cause unwanted response which would prevent the connection being set up correctly. Alternatively signals might be received prematurely.

In four wire systems in which the V. F. signal receiver for each channel is placed in the four wire part of the circuit, signalling in both directions simultaneously is possible, and it is possible to envisage a system in which all signals will reach their destination with certainty subject to the reflection difficulty.

A typical connection includes a two wire link with for instance 50 cycle signalling, three four wire links AB, BC, CD, in tandem each provided with forward and backward voice frequency receivers and transmitters and to another two wire link with 50 cycle signalling.

During the speech time a signalling circuit is maintained from A to D and from D to A and theoretically this forms a duplex connection channel. However, signals from A to D will be reflected from D and returned to A and in adverse circumstances the receiver at A may be operated.

The main feature of the invention comprises a telecommunication exchange system, a four wire to two wire connecting circuit comprising a first means in the incoming channel of the four wire circuit which is arranged continuously to prevent effective signal transmission for said incoming channel towards the hybrid coil during the setting up of a connection including said connecting circuit, a second means for rendering said first means ineffective at the end of setting up a connection, a third means associated with the said incoming channel for responding to incoming voice frequency signal prefixes, and a fourth means (which may be the same as said first means) arranged to be rendered operative by said third means when operated and to prevent effective transmission of prefixed signals from said incoming channel towards the hybrid coil, and to become inoperative at the end of each prefixed signal.

The invention will be particularly described with reference to an embodiment shown in the accompanying drawings in which.

Figure 1:
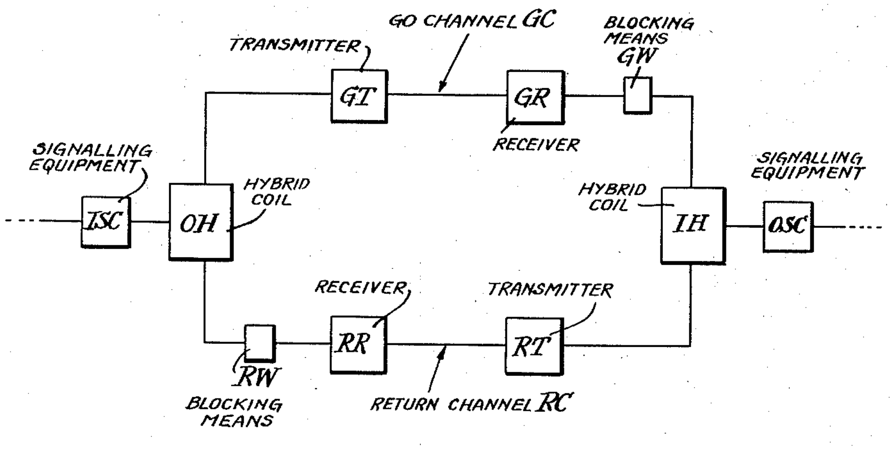
Fig. 1 shows schematically a connection involving two two wire circuits and a four wire circuit showing the appropriate signalling equipment in block form.

Referring now to Fig. 1, an incoming two wire line is provided with incoming signalling equipment ISC and is connected to an outgoing hybrid coil OH to which is also connected the go and return channels GC, RC, of a four wire line which at the incoming end is connected by a hybrid coil IH to an outgoing two wire line provided with signalling equipment OSC.

The four wire line is provided with voice frequency signal transmitters and receivers GT, RT, and GR, RR. Blocking means GW, RW are provided between the signal receivers GR, RR and the adjacent hybrid coils for preventing effective signal transmission.

Figure 2:
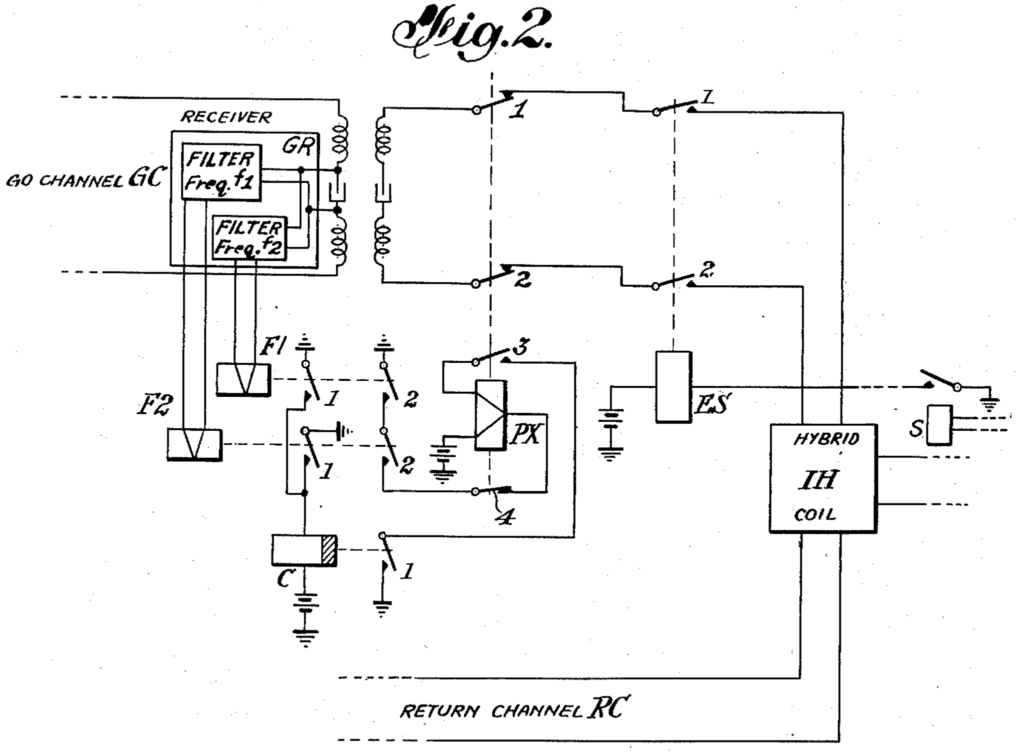
Fig. 2 shows sufficient of the detailed circuits of a four wire to two wire connecting circuit particularly to describe the invention.

Referring now to Fig. 2, the channel GC is normally open at contacts *es*1 and 2 of relay ES. When the four wire line is seized in setting up a connection over circuits such as are indicated in Fig. 1, the signals sent over channel GC to receiver GR during the setting up of the connection are prevented from effective transmission beyond GR by the open contacts *es*1, 2 which also prevent any spurious signals reaching GR via the hybrid coil IH.

When the end of selection signal is received back over the outgoing two wire line, Fig. 1, OSC will respond in well known manner to close a circuit in known manner to operate a supervisory relay S which in turn will cause its associated contact to close the operating circuits for relay ES which will complete the transmission connection from GC to IH.

All signals transmitted after the end of selection will comprise a prefix, whereas signals prior to end of selection usually have no prefix.

In two frequency ($f_1$, $f_2$) signalling systems, the prefix usually consists of a pulse of both frequencies simultaneously while the actual signal or suffix usually consists of a single frequency.

On receipt of a signal prefix transmitted over channel GC relays F1, F2, Fig. 2 of receiver GR, both operate by means of operating current received from the respective band-pass filters shown and two things happen. Slow release relay C is energised via contacts 1 of relays F1, F2 in parallel, and relay PX is energised via contacts 2 of relays F1, F2 in series, and normally closed contact *px*4. Relay PX locks via *px*3, *c*1, and opens its contacts *px*1, *px*2 in the channel GC to prevent transmission of the signal proper beyond GR.

The signal will energise relay F1 or F2 and close a circuit, not shown, in known manner to cause the necessary circuit changes in response to the signal. Contacts 1 of the operated relay F1 or F2 again closes the circuit of relay C.

The interval between the prefix and the signal proper is insufficient to allow slow release relay C to release so, that receipt of the signal proper maintains relay C energised and by its contacts *c*1 maintains relay PX energised.

At the end of the signal, the relay F1 or F2 releases and in due course relay C releases followed by PX and the channel GC is again complete.

Opening of the transmission channel to prevent undesired transmission of signals has been shown so as to keep the circuits as simple as possible, but it is preferable to introduce attenuation without actually opening the channel for instance in the manner shown in copending U. S. Patent application Serial No. 85,862 filed on April 6, 1949, by T. F. S. Hargreaves and W. F. Gould and assigned to the same assignee as the present application and it is to be understood that such arrangements are within the ambit of the invention.

What is claimed is:

1. In a telecommunication exchange system, a four wire to a two wire connecting circuit comprising an incoming channel of the four wire circuit, a hybrid coil connected to said incoming channel and said two wire line, a first means in said incoming channel normally operative to prevent effective signal transmission towards said hybrid coil during the setting up of a connection between a calling subscriber and a called subscriber, a second means in said incoming channel for rendering said first means ineffective after a connection to the called subscriber is established, a third means in said incoming channel responsive to a first portion of an incoming signal, and a fourth means operatively responsive to said third means for preventing effective transmission of said incoming signal to said hybrid coil.

2. In a telecommunication system, the combination as claimed in claim 1 wherein said third means comprises at least two relays and means for operating said relays in response to a signal prefix of two different voice frequency pulses.

3. In a telecommunication system, the combination as claimed in claim 1 wherein said fourth means comprises a relay energized in response to the operation of said third means and a pair of contacts in said incoming channel operated in response to said energized relay to open the transmission channel.

4. In a telecommunication system, the combination as claimed in claim 1 wherein said third means is rendered inoperative at the end of said incoming signal and said fourth means is rendered inoperative by release of said third means.

ESMOND PHILIP GOODWIN WRIGHT.
MARC VAN HASSELT.
DONALD ADAMS WEIR.

REFERENCES CITED

The following references are of record in the file of this patent:

UNITED STATES PATENTS

| Number | Name | Date |
|---|---|---|
| 1,829,803 | Korn | Nov. 3, 1931 |
| 1,961,279 | Crisson | June 5, 1934 |
| 1,986,515 | Mitchell | Jan. 1, 1935 |
| 2,145,095 | Pfleiderer | Jan. 24, 1939 |
| 2,322,833 | Kickieson | June 29, 1943 |
| 2,462,144 | Theillaumas | Feb. 22, 1949 |
| 2,498,723 | Theillaumas | Feb. 28, 1950 |

FOREIGN PATENTS

| Number | Country | Date |
|---|---|---|
| 489,545 | Great Britain | July 25, 1938 |
| 560,807 | Great Britain | Apr. 20, 1944 |